US011986436B2

(12) United States Patent
Luong

(10) Patent No.: US 11,986,436 B2
(45) Date of Patent: *May 21, 2024

(54) PEDICURE CHAIRS AND PUMPS FOR USE WITH PEDICURE CHAIRS AND RELATED METHODS

(71) Applicant: Lexor Manufacturing, LLC, Westminster, CA (US)

(72) Inventor: Christopher L. Luong, Westminster, CA (US)

(73) Assignee: CL Capital Investments Group LLC, Westminster, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,367

(22) Filed: Dec. 15, 2022

(65) Prior Publication Data

US 2023/0121794 A1 Apr. 20, 2023

Related U.S. Application Data

(63) Continuation of application No. 17/365,759, filed on Jul. 1, 2021, now Pat. No. 11,679,062.

(60) Provisional application No. 63/046,814, filed on Jul. 1, 2020.

(51) Int. Cl.
*A61H 33/00* (2006.01)
*A61H 35/00* (2006.01)

(52) U.S. Cl.
CPC ....... *A61H 33/0087* (2013.01); *A61H 35/006* (2013.01); *A61H 2201/0149* (2013.01); *A61H 2201/1207* (2013.01)

(58) Field of Classification Search
CPC .............. A61H 33/0087; A61H 35/006; A61H 2201/0149; A61H 2201/1207; A61H 33/60; A61H 2201/164; A61H 2203/0431; A61H 33/0095; A61H 2201/0207; A61H 2201/1215
USPC .......................... 4/541.1, 538, 491, 493, 545
See application file for complete search history.

(56) References Cited

U.S. PATENT DOCUMENTS

| | | | | |
|---|---|---|---|---|
| 9,205,023 B2 * | 12/2015 | Tran | A61H 33/6063 |
| 9,926,933 B2 | 3/2018 | Le et al. | |
| 10,215,177 B2 | 2/2019 | Le et al. | |
| 10,215,178 B2 | 2/2019 | Le et al. | |
| 10,278,894 B1 | 5/2019 | Le et al. | |
| 10,288,071 B2 | 5/2019 | Le et al. | |
| 10,302,088 B2 | 5/2019 | Le et al. | |
| 10,451,071 B2 | 10/2019 | Le et al. | |
| 10,542,847 B2 | 1/2020 | Luong et al. | |
| 2009/0094735 A1 * | 4/2009 | Tran | A47K 3/10 607/86 |

(Continued)

OTHER PUBLICATIONS

Ex Parte Quayle Action on co-pending US application (U.S. Appl. No. 17/365,759) dated Nov. 25, 2022.

*Primary Examiner* — Lori L Baker
(74) *Attorney, Agent, or Firm* — ALUMEN IP Law PC

(57) ABSTRACT

A jet pump has an impeller with a magnet that can be rotated by a shaft having a magnetic drive plate and wherein the impeller and the magnetic drive plate are separated from one another by at least one solid wall surface. The impeller can be located in a pump housing having a base and a cover. The base can have a surface bearing so that the impeller can contact therewith and rotated against the surface of the surface bearing.

30 Claims, 9 Drawing Sheets

(56) References Cited

U.S. PATENT DOCUMENTS

| | | | | |
|---|---|---|---|---|
| 2009/0158518 | A1* | 6/2009 | Southon | A61H 33/6047 204/667 |
| 2009/0320202 | A1* | 12/2009 | Lawyer | A61H 35/006 4/541.1 |
| 2013/0269098 | A1* | 10/2013 | Tran | A61H 33/6063 464/29 |
| 2017/0290737 | A1* | 10/2017 | Kim | A61H 33/6063 |
| 2019/0328612 | A1* | 10/2019 | Luong | A61H 33/0095 |
| 2020/0154951 | A1* | 5/2020 | Kownacki | A47K 3/02 |

* cited by examiner

PEDICURE CHAIRS AND PUMPS FOR USE WITH PEDICURE CHAIRS AND RELATED METHODS

CROSS-REFERENCE TO RELATED APPLICATION

This is a Continuation Application of co-pending application Ser. No. 17/365,759, filed Jul. 1, 2021, which is a regular utility of provisional application Ser. No. 63/046,814, filed Jul. 1, 2020, the contents of which are expressly incorporated herein by reference.

FIELD OF ART

The present disclosure is directed to apparatuses and methods for recirculating spa jet pumps and for a pedicure chair with a basin having one or more of the jet pumps for recirculating water in the basin and related methods.

BACKGROUND

Certain types of pedicure chairs have a pipe system to introduce water into, and remove water from, the chair's basin. The water is circulated by a conventional motor-driven, shaft mounted, impeller. There is frequently water leakage around the shaft requiring maintenance. Also, the pipe system is subject to accumulation of dirt, mold and bacteria and is very difficult to clean and sterilize after use by customers. If not properly sanitized, there is the possibility of health concerns, safety and anxiety of customers.

A water circulation unit having a stator which creates a rotating magnetic field and is separated from the water by a magnetically permeable wall and a rotor on the opposite side of the wall is known in the art for circulating water. This unit circulates water in the basin of the pedicure chair and typically has a shaft for rotating the impeller.

SUMMARY

There is a need for a circulating system for water in a pedicure bath that circulates water, that can be cleaned and sterilized rapidly and effectively, and that has fewer components for potential wear and tear, and combinations thereof.

In an exemplary embodiment, a spa pump is sized and shaped for use with a basin of a pedicure chair. The spa pump has an impeller with magnet that can be rotated by a magnetic drive plate mounted to a drive shaft of a motor. The impeller can rotate within the pump housing without a shaft. The impeller can rotate within the pump housing, such as within a base of the pump housing, without a shaft fixing the rotating axis of the impeller. Less preferably, a shaft can project from the base wall and into the bore of the impeller, but wherein the shaft and the bore are loose, such that the impeller can shift side-to-side a small amount. In other words, the impeller can spin primarily about the surface bearing and not the shaft, if one is included.

The spa pump of the invention can have an impeller rotated by a magnetic drive plate located on a drive shaft. The impeller can contact or rotate against a surface bearing attached to a base of the pump housing. The impeller can shift side-to-side within the base of the pump housing owing to the fact that no shaft is included to restrict the side-to-side movement of the impeller.

The surface bearing can be made from a hard material with low friction, such as ceramic or porcelain. The surface bearing can be press-fitted into a recess space or area within the base wall of the base of the pump housing. A metal securing ring can be included at or with the surface bearing to improve the magnetic pull of the magnetic drive plate, which is located away from the impeller.

A hub on an impeller with an axial end surface can contact the surface bearing. The axial end surface can be formed as part of the hub or can be formed as a separate insert and the separate insert attached to the hub to provide the axial end surface for rotating against the surface bearing.

Aspects of the invention include a spa pump sized and shaped for use with a basin of a pedicure chair, comprising a motor having a motor casing and a drive shaft protruding from the motor casing, the drive shaft having a magnetic drive plate attached thereto; a pump housing having cover attached to a base and defining a pump cavity therein; a mount adaptor attached to the motor and to the base of the pump housing, the mount adaptor comprising a flange and an extension having a hollow interior having the magnetic drive plate located therein; an impeller located within the pump cavity, the impeller comprising a hub having a first end and a second end and a flange body comprising a magnet; a surface bearing attached to a base wall of the base, the surface bearing having an upper surface and an axial end face at the first end of the hub of the impeller contacts the upper surface of the surface bearing; and wherein the impeller is rotatable within the pump chamber without any shaft projecting into the hub of the impeller.

The base can comprise a central stub having a central surface that is co-planar or recessed from the upper surface of the surface bearing.

A metal securing ring can attach to the surface bearing and both the metal securing ring and the surface bearing can be located in a recessed space or area of a base wall.

A second metal securing ring can attach to the surface bearing.

The magnet of the impeller can comprise a plurality of magnet sections arranged in a pattern of north and south poles.

The cover can comprise a plurality of centrally located inlet openings and a plurality of discharge nozzles located radially outwardly of the plurality of centrally located inlet openings.

The base of the pump housing can comprise a base wall comprising a bottom floor, a first radiused surface radially outwardly of the bottom floor, a first upstanding wall extending from the first radiused surface, a second radiused surface, and a second upstanding wall.

The bottom floor, the first radiused surface, and the first upstanding wall of the base can define an impeller seat having the impeller located therein.

An insert can attach to the hub of the impeller, the insert can comprise an axial end surface for contacting or rotating against a surface bearing.

The hub of the impeller can be solid without a bore.

The mount adaptor can project through an opening of a basin of a pedicure chair.

The base of the pump housing can attach to the flange of the mount adaptor by projecting a plurality of stubs into a plurality of recessed through holes formed on the flange.

A further aspect of the invention include a spa pump sized and shaped for use with a basin of a pedicure chair, comprising a motor having a motor casing and a drive shaft protruding from the motor casing, the drive shaft having a magnetic drive plate attached thereto; a pump housing having cover attached to a base and defining a pump cavity therein, the base having a base wall with a central recessed area having a surface bearing located therein; a mount adaptor attached to the motor and to the base of the pump housing, the mount adaptor comprising a flange and an extension having a hollow interior; an impeller located within the pump cavity, the impeller comprising a hub having a first end and a second end and a flange body comprising a magnet; and wherein the impeller is shift-able side to side within the pump cavity to contact a radiused surface, an upstanding surface, or both the radiused surface and the upstanding surface of the base.

A still yet further aspect of the invention include a method of assembling a spa pump comprising attaching a motor having a motor casing and a drive shaft protruding from the motor casing to a mount adaptor, the drive shaft having a magnetic drive plate attached thereto; attaching a base to the mount adaptor; placing an impeller comprising flange body with a magnet and a hub, the hub comprising a first end with an axial end surface and a second end; attaching a cover to the base; wherein a surface bearing having an upper surface is attached to a base wall of the base and the axial end face at the first end of the hub of the impeller contacts the upper surface of the surface bearing; and wherein the impeller is rotatable within the pump chamber without any shaft projecting into the hub of the impeller.

The method can further comprise attaching a metal securing ring to the surface bearing.

The method can further comprise attaching a second metal securing ring to the surface bearing.

Other aspects of the spa pump and pedicure chair having the spa pump, including methods for making and using same, are further described and shown herein.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of spa jet pumps and pedicure chairs with spa jet pumps provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
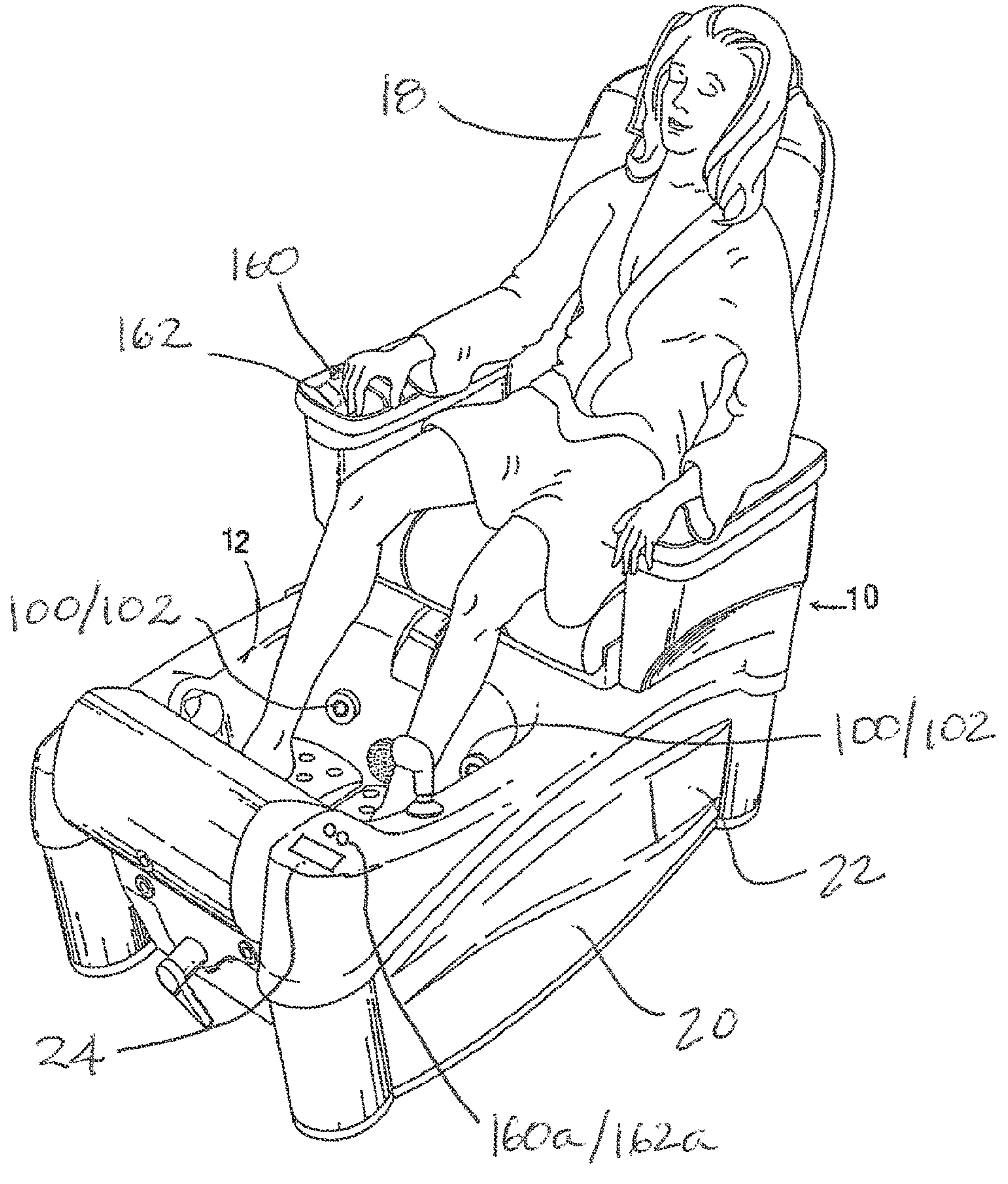
FIG. 1 illustrates a perspective view of a pedicure chair with one or more spa pumps according to one embodiment of the present disclosure.

Referring now to FIG. 1, a pedicure chair 10 comprising a basin 12 for holding a water bath is shown with a user seated on a seat 18. The basin 12 is sized and shaped to receive and bathe the person's feet. Water is circulated in the basin 12 by one or more spa jet pumps or circulating pumps 100 located behind the chair cover 20 and out through covers or nozzles 102 that may be adjustable to direct the flow of water as desired, such as at the person's feet. Two covers 102 are visible in FIG. 1. In some examples, one or more removable panels 22 can be provided with the chair to provide access to the one or more circulating pumps 100 or other spa components disposed behind the basin 12, such as for maintenance and repairs.

In some examples, one or more magnetic drive circulating pumps or magnetic spa jet pumps 100 may be used with the chair 10. The circulating pumps or spa jet pumps may be associated with a heating source to allow the water inside the basin to be heated and maintained at a desired temperature range to provide the user with a better experience than chairs without a similar heating source. Exemplary spa jet pumps having a heating source are disclosed in U.S. Pat. No. 10,542,847, the contents of which are expressly incorporated herein by reference. In other examples, the present spa pump may be used with spa chairs having a heating source located with the chair, such as below the seat and/or in the basin, rather than the pump itself. Exemplary spa chairs with a heating source for the basin is disclosed in U.S. Publication No. 2019/0328612, the contents of which are expressly incorporated herein by reference.

As shown, the chair 10 includes a temperature selector 160 and a display 162 for monitoring the temperature of the water in the basin 12. Other switches or control mechanisms may be included, such as an on/off button and switches for controlling other functions incorporated with the chair, such as to turn on/off the spa pumps 100. The temperature selector 160 may be a simple potentiometer for raising or lowering water temperature or may be a more complicated controller that allows programming and automated adjustments of water temperature. The display 162 may be selectable to display various parameters such as actual water temperature, desired water temperature, elapsed time that the person has immersed their feet in the basin 12, total time, or other parameters. In another example, a second control and display panel 24 is provided nearer the basin 12 to permit the technician or worker to control the water temperature and other parameters. The second control and display panel 24 may include a temperature selector 160*a*, a display 162*a*, an on/off switch, and an emergency override, as non-limiting examples.

A predetermined amount of water can be added to the basin 12 and the water circulated within the basin by the one or more circulating pumps 100. The water can be heated to the desired temperature by means of the temperature selector 160, which can increase or decrease heat input from a heating source that the circulated water comes in contact with to thereby control the water temperature. Additional substances such as conditioners, medicaments, fragrances, etc., may be placed in the basin with the heated water for a holistic experience. A customer seated in the pedicure chair 10 with her feet submerged in the circulating heated water may adjust the water temperature accordingly by the temperature selector 160. The basin 12 can be emptied of water using existing means after the pedicure procedure is completed, and the customer exits the chair 10. Then, the basin 12 and portions of the jet pump 100 that come in contact with the heated water can be sanitized in preparation for the next customer. For example, a new bath with a cleaner or disinfectant may be circulated through the basin to sanitize the chair for the next customer.

Figure 2:
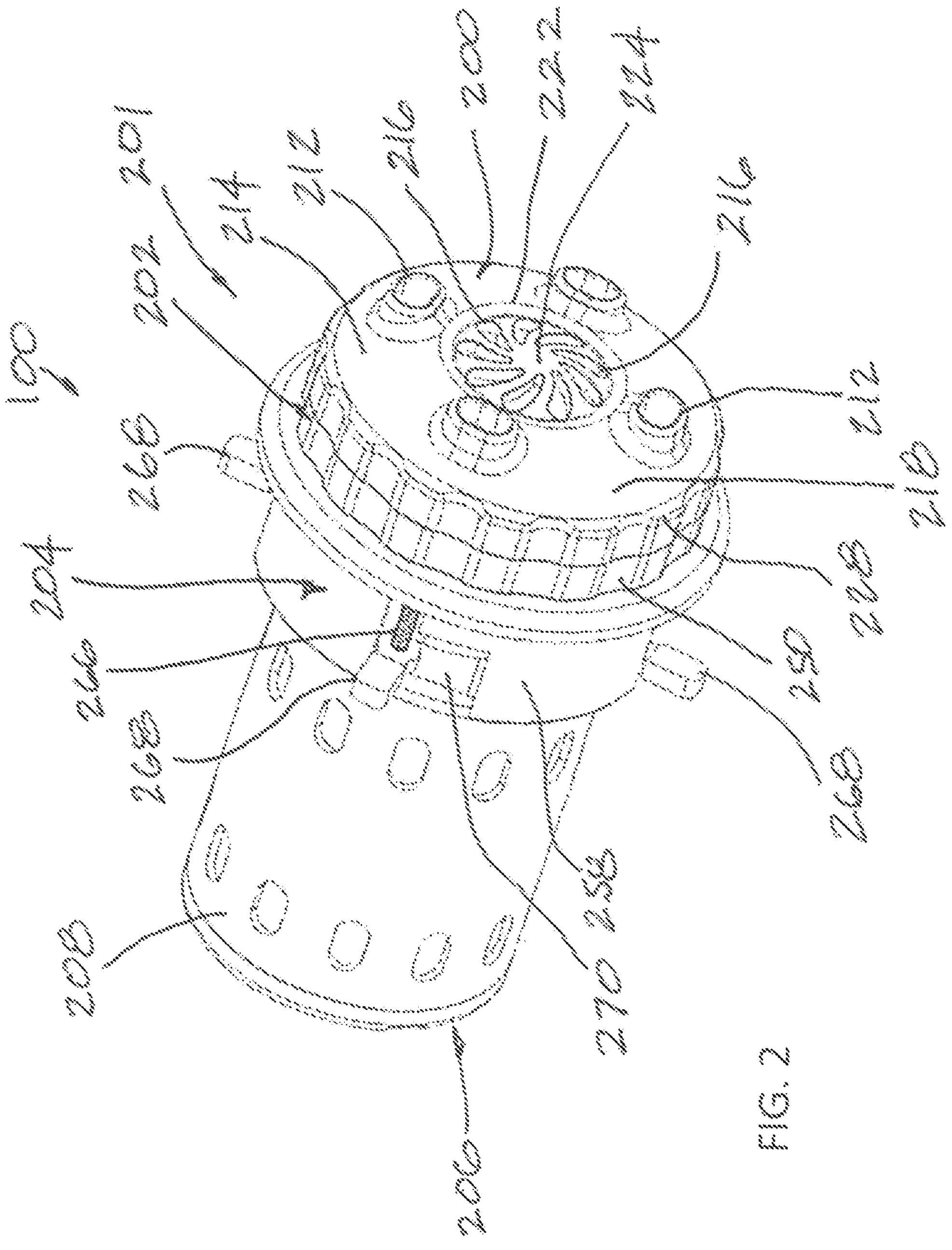
FIG. 2 is a perspective front side view of a spa pump in accordance with aspects of the invention.
Figure 3:
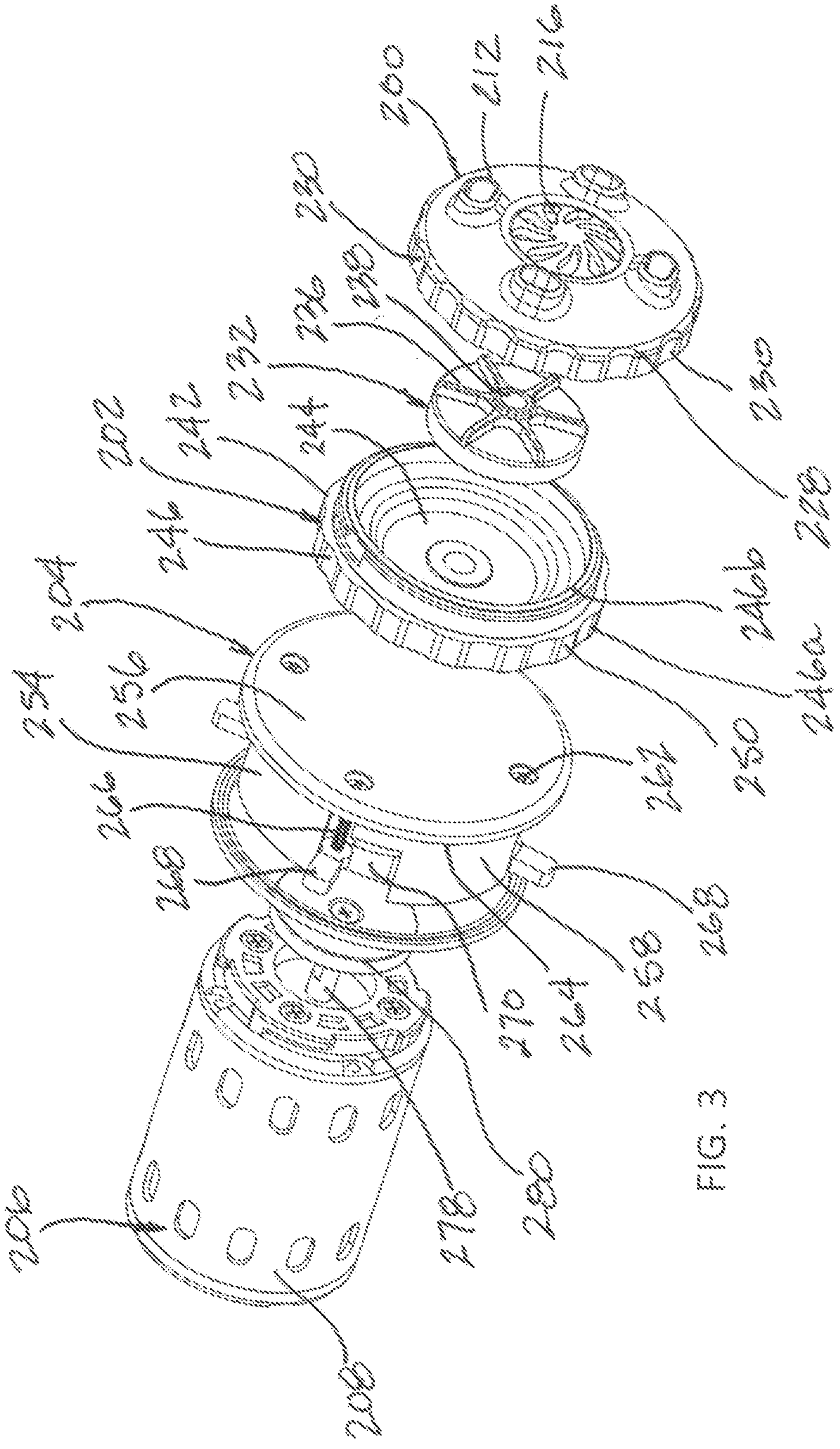
FIG. 3 is an exploded perspective view of the spa pump of FIG. 2.

An exemplary circulating pump 100 usable with pedicure chair 10 of FIG. 1 is illustrated in isometric view in FIG. 2 and in exploded view in FIG. 3. With reference to both FIGS. 2 and 3, the spa jet pump or spa recirculating pump 100 in accordance with aspects of the invention has a cover 200, a base 202, a mount adaptor 204, and a motor 206 comprising a motor casing 208 with optional vent holes. The cover 200 and the base 202 can be considered or called a pump housing 201. From right to left of FIGS. 2 and 3, the cover 200 may be molded from a hard-plastic material, such as ABS, polycarbonate, acrylic, and is shown having a body 214 comprising a wall 218 with a plurality of discharge nozzles 212 extending axially of the exterior surface of the wall 218. The discharge nozzles 212 can be equally spaced on the body 214 and located radially outwardly of a plurality of inlet openings 216. Four discharge nozzles 212 are shown with each comprising a hollow stub and having an oval cross-section. In other examples, there can be fewer than four discharge nozzles, such two discharge nozzles, and the cross-section of the stubs can have a different shape, such as round, square, or other polygonal shapes. In the example shown, the discharge nozzles 212 all have the same cross-section. In other examples, the discharge nozzles can have different cross-sections, such as having one round nozzle and one oval nozzle or some other combinations.

The plurality of inlet openings 216 are dispersed around a central area 222 in a generally round pattern. Each individual opening 216 within the central area 222 has a foil-like shape or an elongated wavy shape with a large rounded end near the outer perimeter of the central area 222 and a smaller rounded end near a central solid section 224. In other examples, the plurality of inlet openings 216 can have different arrangements and shapes. For example, the plurality of inlet openings 216 can be generally round or oval and be dispersed around the central area 222. In some examples, an inlet opening can be located where the central solid section 224 is shown.

A sidewall or skirt 228 can depend from the wall 218 of the cap or cover 200. In an example, a plurality of undulating surfaces 228, similar to gear teeth, are incorporated on the exterior of the skirt 228. The undulating surfaces 228 provide both aesthetic appeal as well as functional features by providing gripping surfaces to facilitate attaching and removing the cover from the base 202 when turning the cover to snap lock against the rim of the base 202, as further discussed below.

An impeller 232 is provided in the pump chamber 236 defined by the cover 200 and the base 202 (FIG. 4), as further discussed below. In the example shown, the impeller 232 is an open face impeller comprising six vanes 236. The vanes 236 can be straight vanes as shown, backward curved vanes in which each vane bends away from the direction of rotation, or forward curve vanes in which each vane bends towards the direction of rotation. The vanes 236 can extend radially from a central area 238. In the example shown, the central area 238 has a solid central region, without any through hole. The solid central region of the central area 238 can be practiced by not incorporating any shaft or rod element extending from the base wall and projecting into the impeller, as further discussed below. In other examples, the central area 238 can include an opening or through bore but without any shaft or rod element extending into the impeller 232 from the base 202, as further discussed below.

The base 202 is shown with a body 242 comprising a base wall 244 and a sidewall 246 extending therefrom. The sidewall 246 can comprise a lower sidewall section **246*a* and an upper sidewall section 246*b*. The lower sidewall section 246*a* can have a larger outer diameter than the upper sidewall section 246*b* and can have a plurality of undulating surfaces 250 resembling gear teeth. The upper sidewall section 246*b* is recessed in the radial direction from the exterior of the lower sidewall section 246*a* so that when the upper sidewall section is connected to the cap or cover 200 in a snap lock engagement, the sidewall 228 of the cap and the lower sidewall section 246*a* of the base 202 generally match, as shown in FIG. 2. In an example, the snap lock engagement is arranged so that when male and female detents of the cap and the base engage and the cap rotates relative to the base, the undulating surfaces 230 of the cap or cover 200 and the undulating surfaces 250** of the base align.

The mount adapter 204 is shown with a body 254 comprising a flange 256 and an extension 258 extending from the flange 256, in the direction away from the cover 200. The extension 258 is similar to a hollow cylinder. In an example, the mount adaptor 204 is made from a hard-plastic material, which can be the same, similar or different hard plastic from the material used to make the cover 200. The flange 256 can have an outer diameter that is larger than the outer diameter of the extension 258. The differences in diameters between the flange 256 and the extension 258 define an extended lip or an overhang 264. The overhang 264 provides a structure of surface for incorporating a plurality of recessed through bores 262 for use with fasteners and pawls to secure the mount adaptor to a basin.

The plurality of recessed through bores 262 can be provided through the flange 256 and open on the underside of the flange 256 at the extended lip or overhang 264. Each of the recessed through bores 262 is configured to receive a bolt 266 so that the bolt head of the bolt is located within the recessed through hole 262 and the shank projects through the through hole and threaded with a pawl 268 on the opposite side. Each of the pawls 268 can be rotated from a collapsed position or tucked away position wherein the pawl is located in a corresponding pocket 270 formed on the extension 258 and an extended position in which the pawl is rotated away from the pocket 270. The mount adaptor 204 is configured be mounted in the opening of a basin 12 of a pedicure chair 10 (FIG. 1) with the flange 256 of the mount adaptor located in or facing the cavity of the basin 12 and the extension 258 projecting through the opening of the basin and located exteriorly of the basin cavity. The motor 206 can then connect to the mount adaptor 204 at a location exterior of the basin and the base 202, the impeller 232 and the cover 200 are attached to the flange 256 at a location within the basin cavity.

In use, a gasket 274 can be placed against the flange 256 at the extended lip 264. The gasket 274 can have an opening sized to surround the bolt pattern used to thread the pawls 268. When installed, the gasket 274 can be located on the basin cavity side with the flange 256 of the mount adaptor 204. The pawls 268 can then rotate to their extended positions as shown in FIG. 3 after the extension 258 projects through the opening formed through the basin wall. The fasteners or bolts 266 situated in the recessed through bores 262 can then be rotated to tighten the pawls 268 against the exterior of the basin wall. The bolts 266 should be tightened a sufficient amount so as to compress the gasket 274 between the flange 256 and the basin wall to form a liquid tighten seal. The motor 206 can then attach to the mount adaptor 204 and the pump cover 200 and base 202 can then attach to the flange 256, on the inside of the basin.

In an example, four recessed through bores 262 are provided through the flange 256 with a different number of recessed through bores contemplated, such as fewer than four or greater than four, such as five, six or seven. The recessed through bores can be randomly spaced or equally spaced near the outer perimeter of the flange 256, at the overhang 264. The number of through bores 262 determines the number of bolts 254 and pawls 268 usable with the recessed through bores 262 to mount the mount adaptor 204 onto the basin wall.

The base 202 can be provided with the same or fewer number of stubs or locating pins as the number of recessed through bores 262 on the flange 256. The locating pins located on the base 202 can align with the recessed through bores 262 and engage the recessed through bores 262 to prevent relative rotation between the base 202 and the mount adaptor 204. The base 202 and the mount adaptor 204 can further be anchored or removably fixed in place by the magnetic pull between the impeller 232 and the magnetic drive plate 280 located with the motor, which forces the base wall 244 (FIG. 3) and the flange 256 located between the impeller 232 and the magnetic drive plate 280 to squeeze together, as further discussed below. In an example, each individual bolt 266 can be provided with an O-ring or a gasket for sealing against the bolt head and the base of the through bore 262.

With reference to FIG. 3, the motor 206 has a drive shaft 278 extending axially out the motor casing 208. A magnetic drive plate 280 is located at the end of the drive shaft 278 and secured to the drive shaft with a lock nut, screw, or a fastener. The drive shaft can have a keyway or a chamfered section and the magnetic drive plate 280 can have a correspondingly shaped bore to receive the drive shaft 278 or receive part of the drive shaft. As shown, the magnetic drive plate 280 is round with a thickness or depth and a central opening for accommodating the drive shaft and the fastener.

As further discussed below, when the motor 206 is powered on to rotate the rotor which then rotates the drive shaft 278, the magnetic drive plate 280 also rotates at the speed of the drive shaft. The drive shaft 278 and the magnetic drive plate 280 are both covered by the flange 256 and do not project through the flange. As the magnetic drive plate 280 rotates, the magnet sections with different magnetic poles positioned within the impeller 232 are attracted to the magnetic pull of the rotating magnet of the magnetic drive plate 280 and rotates. Thus, the impeller 232 can rotate within the pump chamber 236 without any direct connection to the drive shaft 278, using only the magnetic drive of the magnetic drive plate 280 attracting the opposite magnetic poles of the impeller.

Figure 4:
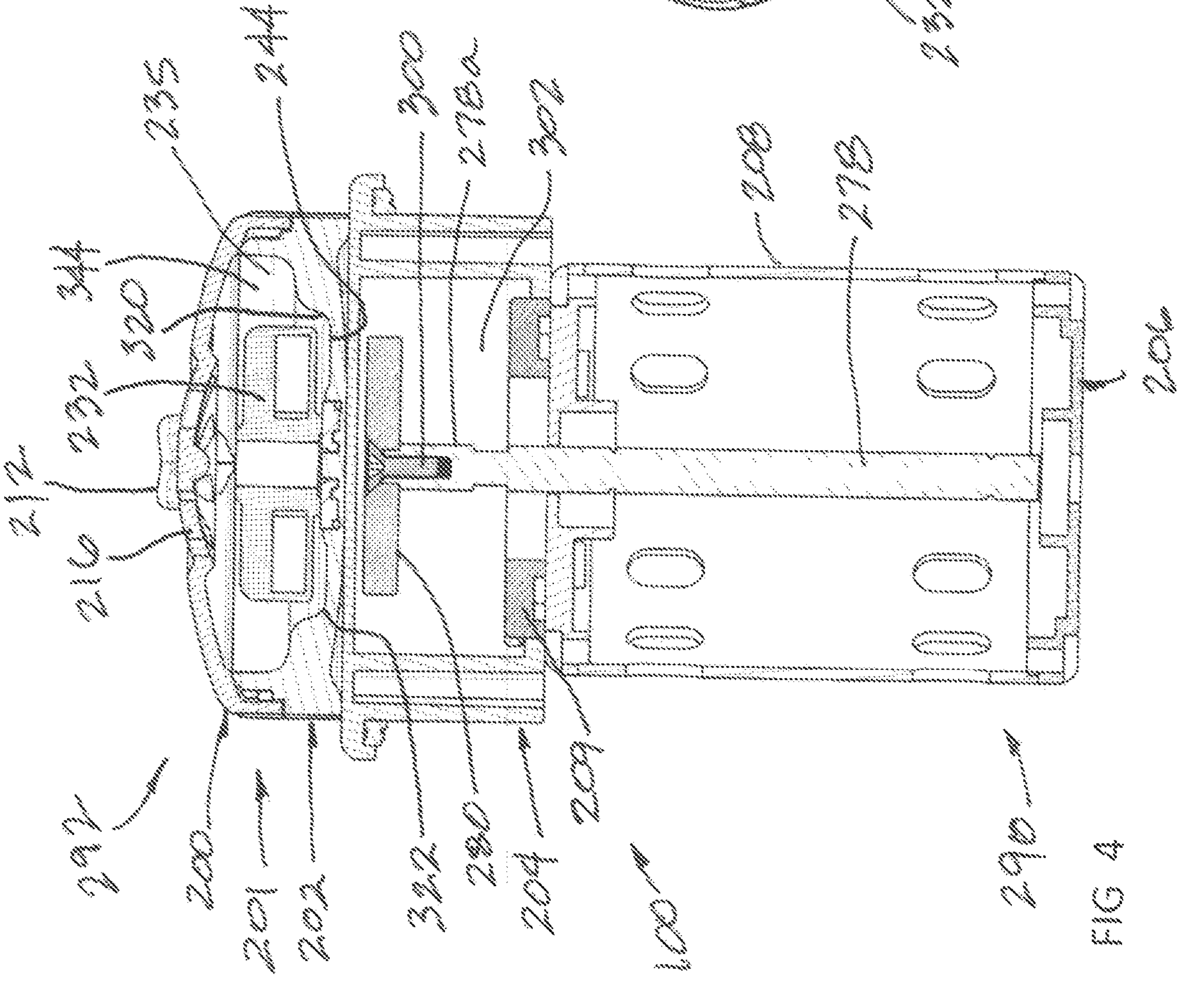
FIG. 4 is a schematic cross-sectional side view of the pump of FIG. 2.

With reference now to FIG. 4 with continued reference to FIGS. 2 and 3, a cross-sectional view of the spa jet pump 100 is shown, in schematic. For discussion purposes, the spa jet pump 100 can be said to have a drive end 290 and a driven end 292. The drive end 290 can be a single phase asynchronous or induction motor 206 rated for 120 VAC, 60 Hz, with an amp rating of 0.5-0.8 A. However, other small electric motor types are usable with the driven end 292, which comprises the base 202, the impeller 232, and the cover 200. The motor 206 is connected to electrical wiring, which is configured to be connected to a power source when mounted to the chair 10, such as an AC electrical outlet or to a power supply contained within the chair 10 (not shown). The motor 206 has a drive shaft 278 having a shaft end 278*a* that protrudes from the motor casing 208 through a shaft opening on the motor casing. The drive shaft 278 is connector to a rotor, which is rotated by a stator fixed to the motor casing 208. The magnetic drive plate 280 is shown attached to the shaft end 278*a* with a fastener 300. The drive shaft 278, specifically the shaft end 278*a*, and the magnetic drive plate 280 are both confined within the interior space 302 defined mount adaptor 204 and the motor casing endcap 209. The magnetic drive plate 280 and the impeller 232 are spaced from one another. As shown, the flange 256 of the mount adaptor 204 and the base wall 244 of the base 202 are located between the magnetic drive plate 280 and the impeller 232.

The base 202 is attached to the mount adaptor 204 using the magnetic pull between the impeller 232 and the magnetic drive plate 280. The mount adaptor 204 is in turn secured to the motor casing 208 using fasteners, snap lock fittings, detents, or combinations thereof. For example, the extension 258 of the mount adaptor 204 can have a snap fit lock with the endcap 209 secured to the motor casing 208. The magnetic attraction forces the impeller 232 towards the magnetic drive plate 280 to thereby clamp the base wall 244 of the base 202 therebetween to secure the base 202 to the mount adaptor 204. The base 202 is rotatably fixed relative to the flange 256 of the mount adaptor via the stubs extending from the base wall 244 engaging the recessed through bores 262, as previously discussed.

Figure 9:
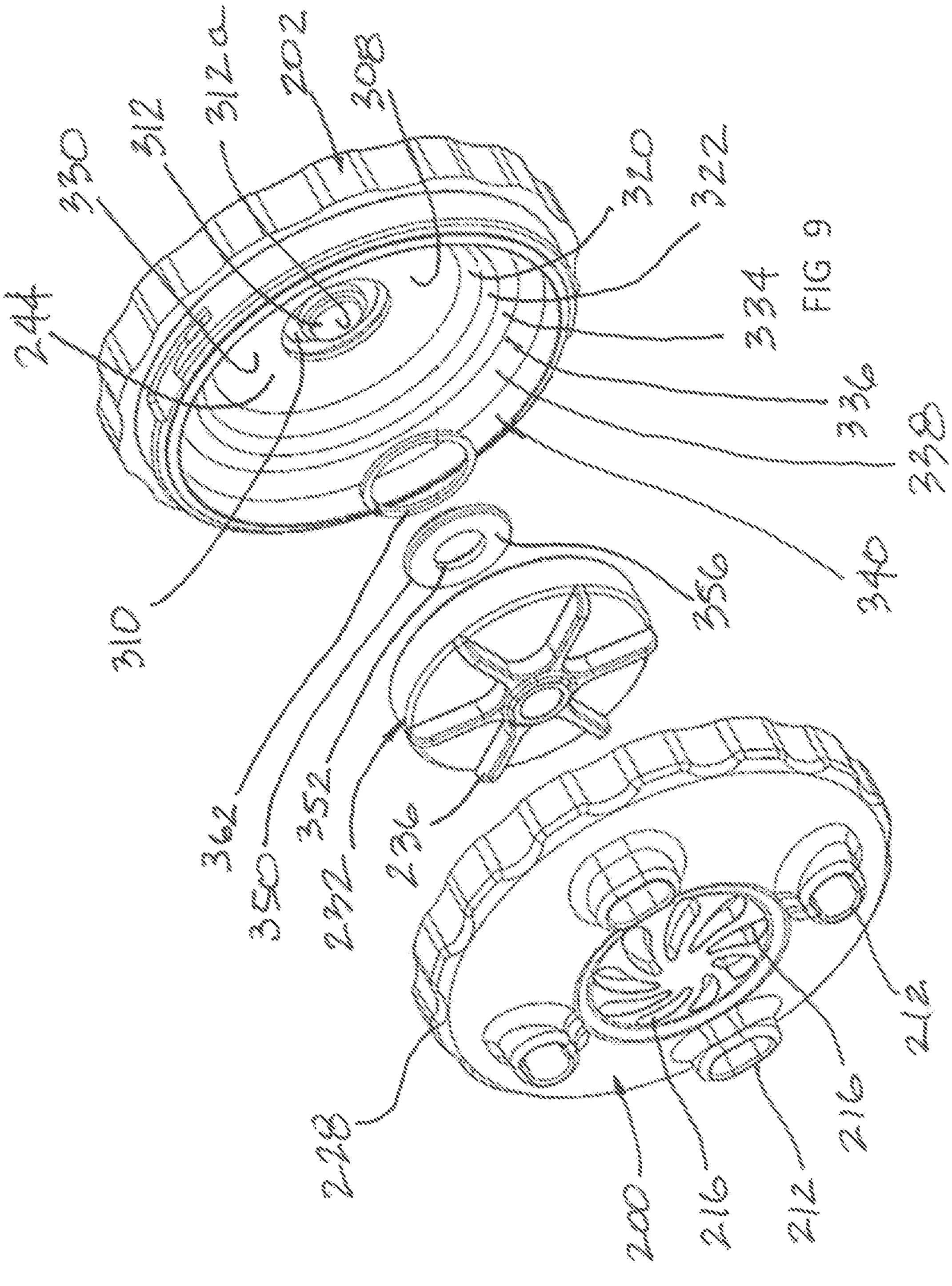
FIG. 9 is an exploded perspective view of the pump housing.

With reference to FIG. 9 and further reference to FIG. 4, the base wall 244 of the base 202 has a bottom surface or bottom floor 308, an annular channel 310, and a central stub 312 in the middle of the annular channel 310. In other examples, the central stub is omitted, and the central part of the base wall is a round recessed area. The base wall 244 is preferably solid, without any passage or through opening. The annular channel 310 has an annular channel floor or bottom for receiving a surface bearing 350. In one example, the central surface 312*a* of the central stub is co-planar with the bottom surface 308 of the base wall 244. In other examples, the two surfaces can be parallel but not co-planar. As shown, the central surface 312*a* is solid, planar, and does not include a shaft or a rod extending therefrom for projecting into the impeller to fix the axis of rotation of the impeller 232. Instead and as further discussed below, the impeller is sized and shaped to rotate within a recessed space of the base 202 without a shaft projecting into the impeller to fix the axis of rotation of the impeller. The omission of the shaft reduces potential wear and tear between component or components of the impeller and the shaft.

A first radiused surface 320 is provided radially outwardly of the bottom floor 308 of the base 202 and extends into a first upstanding wall 322, which can be vertical or can have a slope. As shown in the cross-sectional view of FIG. 4, the bottom floor 308, the first radiused surface 320 and the first upstanding wall 322 define an impeller seat 330 for accommodating the impeller 232. The impeller 232 has a maximum diameter that is smaller than the diameter of the first upstanding wall 322 such that a gap exists between the outer diameter of the impeller 232 and the upstanding wall 322. The gap allows any potential off-axis spinning of the impeller to not rub against the first upstanding wall 322 as the impeller rotates. Further, because no shaft is used to fix the axis of rotation of the impeller 232, the impeller 232 can shift side-to-side, or radially of the lengthwise axis of the pump, while in the assembled position. The impeller 232, without any shaft fixing the axis of rotation of the impeller, is shift-able within the pump chamber to touch or contact different parts or sections of the first radiused surface 320, the first upstanding wall 322, or both.

A second radiused surface 334 is located at an end of the first upstanding wall 322 and extends to a first raised floor or surface 336, which can be flat and parallel to the bottom floor 308. Optionally, the first raised floor or surface 336, raised from the bottom floor 308, can have a slope. The first raised floor 336 extends radially towards a third radiused surface 338, which then extends into a second upstanding wall 340, which can be vertical or can have a taper from vertical. The first raised floor 336, the third radiused surface 338, and the second upstanding wall 340 define an outflow chamber within the pump chamber 235 of the driven end 292. When the impeller 232 rotates, water drawn in through the inlet openings 216 of the cover 200 is forced radially outwardly by the vanes 236 against the second upstanding wall 340 at the outflow chamber 344. This higher-pressure water circulated by the vanes 236 then exits out through the one or more outlet or discharge nozzles 212 to generate water jets at the outlet or discharge nozzles.

In some examples, the bottom floor 308 extends to a single radiused surface which then extends to a single upstanding wall at the perimeter of the base, without a separate outflow chamber 344 and impeller seat 330, such as having only a single chamber within the pump chamber. In still other examples, additional radiused surfaces and upstanding walls can be incorporated above the impeller seat 330.

With reference again to FIG. 9, a surface bearing 350 embodying the shape of a washer can be attached to the annular channel 310 of the base wall 244. In an example, the surface bearing 350 has a central opening 352 for placement over, around, or for receiving the central stub 312 at the base wall 244. The outer diameter of the surface bearing 350, the inside diameter of the central opening 352, or both the outer diameter and the inside diameter are sized and shaped to engage the opening of the annular channel 310 and/or the central stub 312 in an interference fit to retain the surface bearing 350 within the annular channel 310. When installed within the annular channel 310, the outer surface or upper surface 356 of the surface bearing 350 is generally flat or generally co-planar with the surface of the central surface 312*a* of the central stub 312. In other examples, the outer surface 356 of the surface bearing 350 seats slightly higher, elevation-wise, within a few thousands of an inch than the central surface 312*a*. The higher outer surface or upper surface 356 allows the impeller 232 to ride against the surface bearing 350, as further discussed below. Where no central stub 312 is provided in the central part of the base wall 244 is merely a recessed area, the surface bearing can have a solid matching structure to fill the recessed area or can still include a central opening 352. Although the surface bearing is shown with a round outer diameter, other shapes may be used.

The central area of the impeller 232 is pressed against the surface bearing 350 when the pump 100 is assembled and during operation of the pump, wherein the impeller 232 rotates by the magnetic pull of the magnetic drive plate 280 (FIGS. 3 and 4). Thus, the surface bearing 350 not only supports the impeller 232 in the axial direction, it also provides a bearing surface for the impeller to spin or rotate against. In an example, the surface bearing 350 is made from a low friction Teflon material. More preferably, the surface bearing 350 is made from a ceramic material. Less preferably, a metal surface bearing may be used. Thus, in service, the impeller 232 and the surface bearing 350 both have planar surfaces in a radial direction that contact and rotate relative to one another. The impeller rotation can be without any shaft or rod projecting from the base into the impeller to fix the rotational axis of the impeller. The base 202 does not include any shaft that projects into the impeller when the impeller rotates against the surface bearing. Instead, the impeller 232 rotates within the impeller seat 330 defined at the base wall 244 of the base 202 without any shaft projecting into the impeller.

To retain the impeller 232 to the pump housing 201, and particularly to the base 202 of the pump housing, such as when the pump housing is removed from the mount adaptor 204, a metal securing ring 362 (FIG. 9) can be provided with the surface bearing 350. In an example, the metal securing ring is a ferromagnetic metal. For example, the metal securing ring 362 can have at least one of the following metal components: iron, nickel, cobalt, gadolinium, dysprosium, and alloys that also contain specific ferromagnetic metals. In an example, the metal securing ring 362 is located in the annular channel 310 with the surface bearing 350 but spaced from the impeller. In other words, the metal securing ring 362 can be recessed or have surfaces located below, elevation-wise, the outer surface 356 of the surface bearing 350 so that during operation, the impeller does not rotate against the surface of the metal securing ring 362. For example, the metal securing ring can locate entirely between the surface bearing 350 and the impeller 232. Less preferably, the upper surface of the metal securing ring 362 can be coplanar with the outer surface 356.

In an example, the surface bearing 350 can fit within the opening of the metal securing ring 362 and the combination press-fitted into the annular channel 310 of the base wall 244. The surface bearing 350 can be thicker or has a greater thickness than the thickness of the metal securing ring 362 so that when assembled, the metal securing ring 362 is recessed from the outer surface 356 of the surface bearing 350 to ensure no direct contact between the impeller 232 and the metal securing ring 362. Placing the metal securing ring 362 between the impeller 232 and the magnetic drive plate 280, in the annular channel 310, allows the impeller 232 to remain with the base 202 via magnetic attraction between the magnet of the impeller 232 and the metal securing ring 362. For example, when the pump housing 201 is removed from the mount adaptor 204 and there is no longer any magnetic pull between the impeller 232 and the magnetic drive plate 280, the magnet in the impeller 232 attracts to the metal securing ring 362 to retain the impeller to the base 202 of the pump housing. This is especially useful when the pump housing 201 is removed from the mount adaptor 204 and the cover 200 is removed from the base 202. In some examples, the metal securing ring 362 is similarly shaped as the surface bearing 350 and is placed first into the annular channel 310 and before placement of the surface bearing into the annular channel and over the metal securing ring 362.

In another embodiment, a second metal securing ring (not shown) may be practiced with the first metal securing ring 362 and the surface bearing 350 shown in FIG. 9. The second metal securing ring may fit within the central opening 352 of the surface bearing 350 while the first metal securing ring 362 fits around the OD of the surface bearing 350 as previously discussed. The combination with the two metal securing rings is then press-fitted into the annular channel 310. The ID of the surface bearing 350 and the dimension of the second metal securing ring may be adjusted accordingly to fit around the central stub 312.

In still other examples, a separate second annular channel is provided in the base wall 244 of the base for receiving the metal securing ring 362. For example, a second annular channel concentric with the annular channel 310 can be provided in the base wall 244. A metal securing ring 362 can be located in the second annular channel instead of or in addition to being located in the annular channel 310 with the surface bearing.

Figure 5:
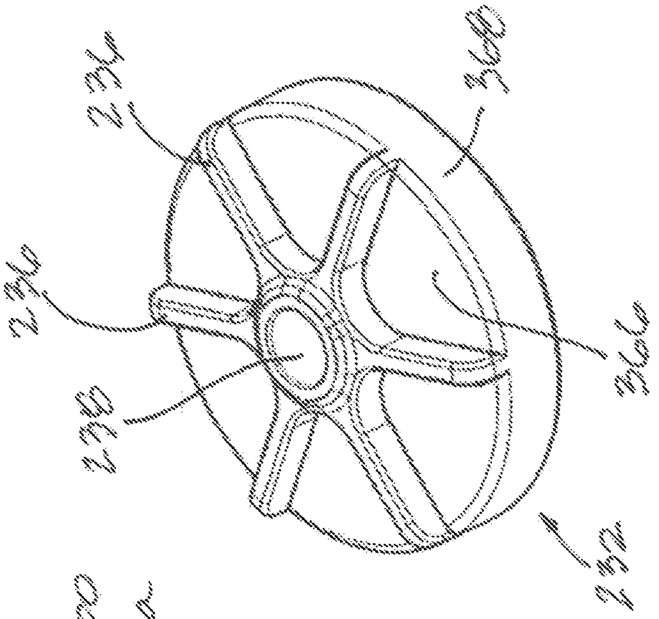
FIG. 5 is a perspective view of an impeller in accordance with aspects of the invention.

FIG. 5 is a closeup view of an impeller in accordance with aspects of the invention. The impeller 232 is shown with six straight vanes 236 extending axially above the upper surface 366 of the impeller. Each vane 236 can extend from a central area 238 and radially out towards the OD of the impeller 232, which has a side surface 368. As shown, each vane extends all the way up to the arc of the outer diameter. However, in other examples, the vane can extend short of the arc of the OD. In some examples, the central area 238 can be smaller than as shown or even eliminated so that each vane can extend radially inwardly towards and even to a central point of the impeller.

Figure 7:
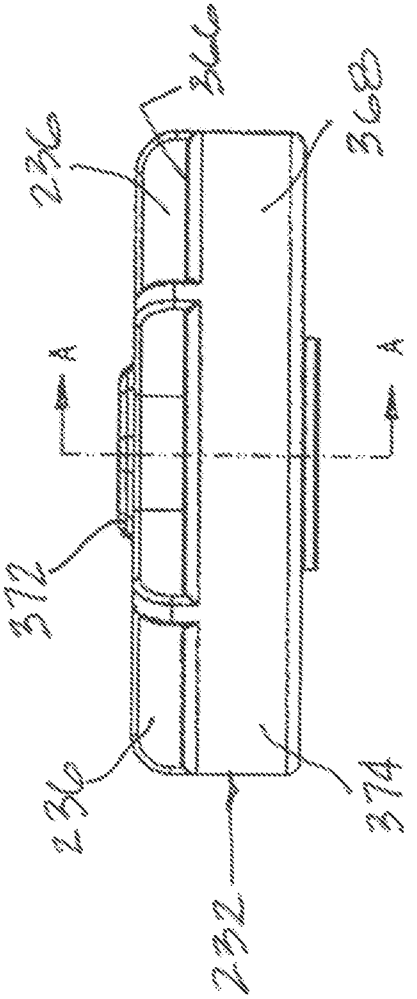
FIG. 7 is a side view of the impeller of FIG. 5
Figure 8:
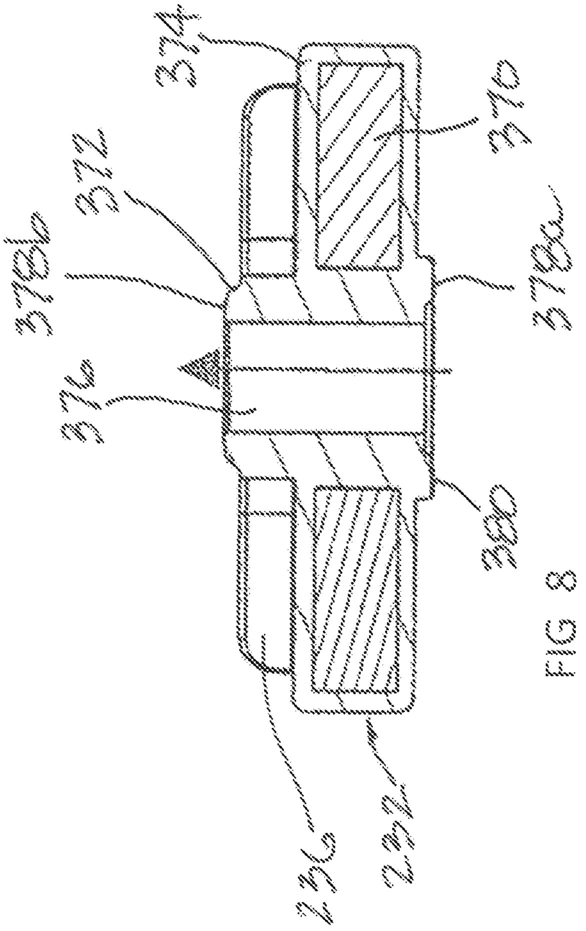
FIG. 8 is a cross-sectional side view of the impeller of FIG. 7 taken along line A-A.

FIG. 7 is a sideview of the impeller 232 of FIG. 5 and FIG. 8 is a cross-sectional side view of the impeller of FIG. 7 taken along line A-A. In an example, the impeller is formed by plastic injection molding. As shown in FIG. 8, the impeller 232 can be formed by injection molding a plastic layer around a magnet or magnet sections 370. The impeller 232 can have a central hub 372 with flange body 373. The flange body 374 can encapsulate a magnet or magnet sections 370 therein. Vanes 236 can extend axially upwardly of the upper surface 366 of the flange body 374. The hub 372 can have a hollow bore 376 having a first end 378*a* and a second end 378*b*. The two ends can be open and communicate with one another via the bore 376. Although no shaft projects through the bore 376 of the impeller, as discussed above, the impeller 232 can be formed using the same mold as impellers that do receive a shaft within the bore. However, in other examples, the bore 376 is omitted and the hub 372 is solid or is without the bore. In service, the bottom axial end face 380 of the hub 372 is configured to contact and ride against the surface bearing 350 in the manner discussed elsewhere herein.

In the example shown, the hub 372 is unitarily formed with the flange body 374 and the vanes 236. In other examples, a separately formed insert may be made and then attached to the first end 378*a* of the hub or forms part of the first end 378*a* of the hub 372. The separately formed insert can be a replaceable component that wears over time as the impeller 232 rides against the surface bearing 350. In an example, the separately formed part or insert can have a complementary shape to attach to the hub 372 to form the first end 378*a* or part of the first end of the hub. For example, the separately formed insert can have a planar axial end face, similar to the axial end surface 380 of the hub 372, and a body with detents or tabs for attaching to complementary attachment structures of the hub 372. In a particular example, the insert can resemble a washer made from a hard-plastic material with a smooth finish, such as PVC, ABS, Nylon, Teflon, or PTFE, to name a few examples. The insert can alternatively have a solid planar body without a central opening of a washer. The separately formed insert can have a diameter that is substantially larger than the height of the insert, in the order of at least four to one. In still other examples, the separately formed insert can extend the full height of the hub 372. For example, the separately formed insert can project through the bore of the hub 372 and secured to the hub.

Figure 6:
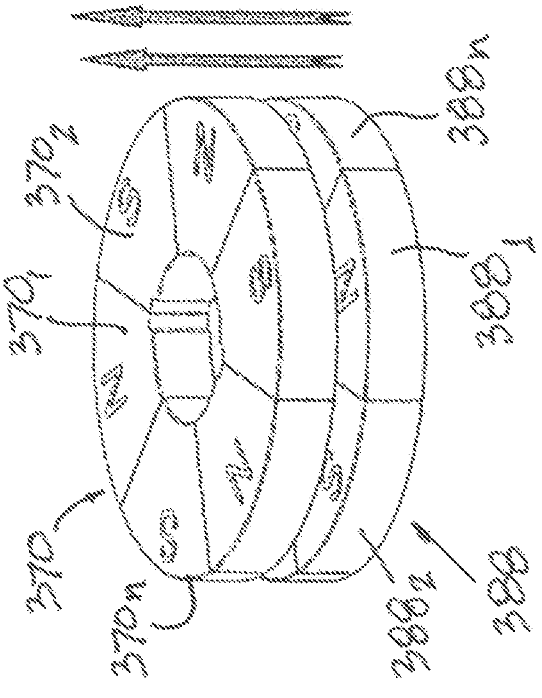
FIG. 6 is a perspective view of two magnets with each magnet formed using different magnet sections arranged in alternating N-pole and S-pole.

With reference now to FIG. 6 in addition to FIGS. 7 and 8, two magnets are shown 370, 388 for discussion purposes. Each magnet can be made from a plurality of magnet sections. For example, the upper magnet 370 can be made with magnet sections $\mathbf{370}_1$, $\mathbf{370}_2$, . . . $\mathbf{370}_n$, where n represents a whole integer grater than 1. As shown, n equals to 6, representing six magnet sections used to form the upper magnet 370. The lower magnet 388 can have similar magnet sections $\mathbf{388}_1$, $\mathbf{388}_2$, . . . $\mathbf{388}_n$, where n equals to 6, representing six magnet sections used to form the lower magnet 388. In other examples, n can represent a different whole integer such as 2, 4 or 8.

Magnets are known to have north N and south S poles. Opposite poles are attracted to each other while the same poles repel each other. For example, a magnet with an N-pole can move and can pull a magnet with a S-pole via magnetic attraction. As shown, the upper magnet 370 is made from a plurality of magnet sections $\mathbf{370}_1$, $\mathbf{370}_2$, . . . $\mathbf{370}_n$, stacked in an alternating pattern between N-pole and S-pole in a circle. Each of the magnet sections is pie shaped with the inside of each section truncated so as to form an opening at the center of the magnet when the magnet sections are stacked in a circle. The upper magnet 370 is then bonded in the pattern shown and plastic is injection molded over the magnet to form the impeller 232 shown in FIGS. 7 and 8.

When stacked over the lower magnet 388 with similar arrangement of magnet sections $\mathbf{388}_1$, $\mathbf{388}_2$, . . . $\mathbf{388}_n$, the two magnets 370, 388 are understood to attract one another when the upper and lower magnet layers are offset between N/S-poles as shown. However, if the two magnets 370, 388 are aligned such that the upper and lower magnet sections are arranged as S/S and N/N, then the upper and lower magnets with repel one another, causing the two magnets 370, 288 to further space from one another.

In the pump configuration shown in the exploded view of FIG. 3, if the lower magnet 388 represents the magnetic drive plate 280 and the upper magnet 370 represents the impeller 232, as the magnetic drive plate 280 rotates, the N and S magnet sections of the upper magnet will align and automatically follow the rotation of the magnetic drive plate 280 through the principles of opposite poles attract and similar poles repel. In an example, the lower magnet 388, with the N and S magnet sections $\mathbf{388}_1$, $\mathbf{388}_2$, . . . $\mathbf{388}_n$ can be plated in one or more metal coatings to form the magnetic drive plate 280 of the present invention.

In an example, rather than forming the magnetic drive plate 280 out of magnetic sections of both N and S poles as shown in FIG. 6, the magnetic drive plate 280 is made entirely out of either a N-pole magnet or a S-pole magnet, but not both. This arrangement limits the magnetic attraction between the impeller 232 and the magnetic drive plate 280 when less magnetic attraction is desired. In still other examples, the relative sizes of the magnet sections of the N and S poles used to form the impeller 232 and/or used to form the magnetic drive plate 280 can differ. For example, the N magnetic sections can be wider or larger than the S magnetic sections, or vice-versa.

Magnets usable with the impeller 232 and the magnetic drive plate 280 can be a permanent magnet of the neodymium iron boron (NdFeB) type, samarium cobalt (SmCo) type, alnico type, or ceramic or ferrite magnets, or combinations thereof.

Figure 10:
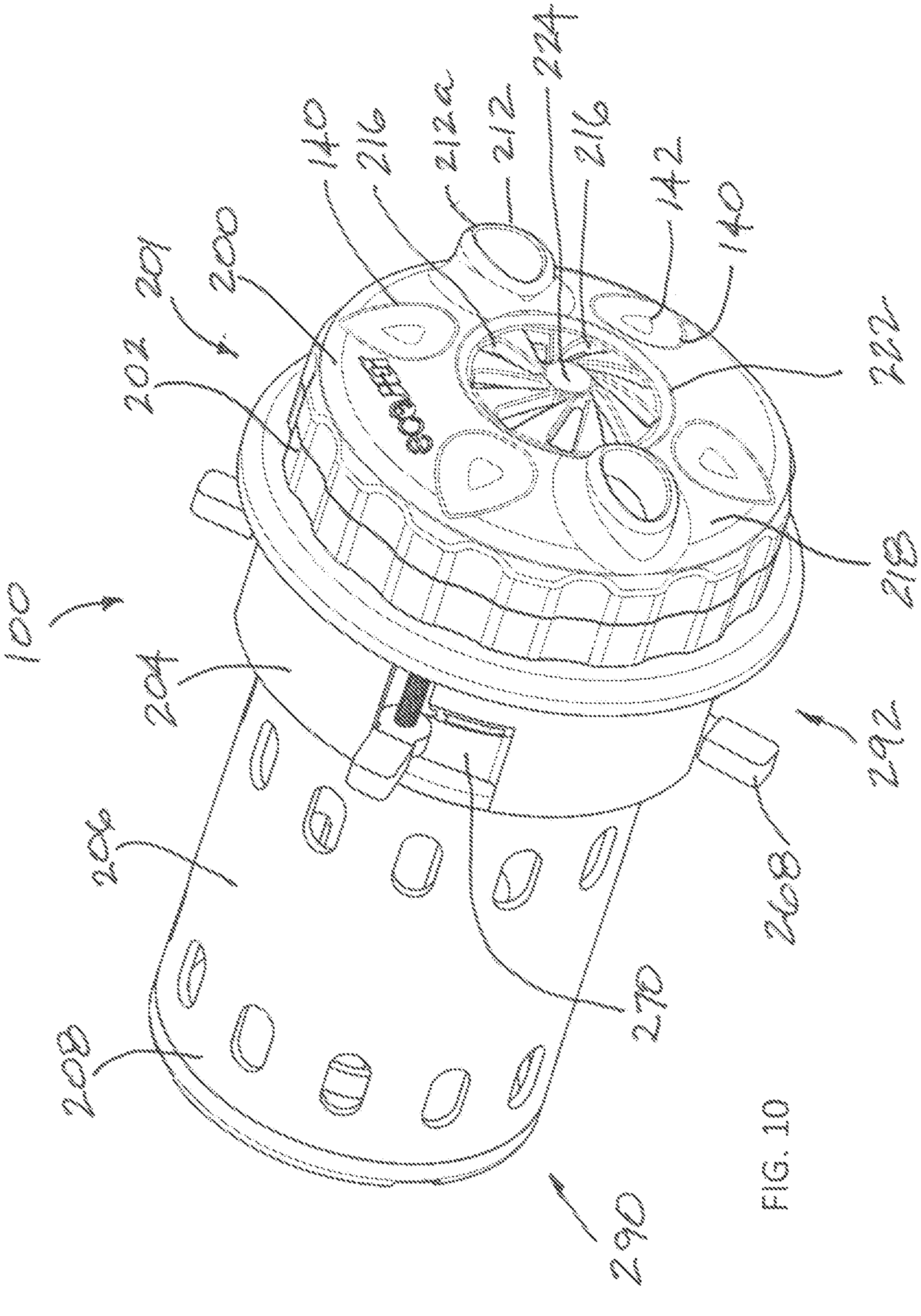
FIG. 10 is a perspective front side view of a spa pump in accordance with further aspects of the invention.

With reference now to FIG. 10, a perspective view of an alternative spa jet pump 100 in accordance with further aspects of the invention is shown. The present pump 100 comprises a drive end 290 comprising a motor 206 and a driven end comprising a pump housing 201, which has a cover 200 and a base 202 having an impeller located therein. The pump housing 201 is attached to the motor 206 via a mount adaptor 204. The present pump 100 is similar to the pump 100 of FIGS. 2-9 with a few differences discussed herein. The spa jet pump 100 of the present embodiment is usable with a pedicure chair in the same way as previously described.

In the present embodiment, the cover 200 comprises a plurality of inlet openings 216 dispersed or situated around a round or circular pattern 222. Each inlet opening 216 is generally rectangular with the two shorter sides being of unequal side. The longer of the two shorter sides can be located adjacent the perimeter of the circular pattern 222 while the shorter of the two shorter sides can be located near the central solid section 224.

The plurality of discharge nozzles 222 can comprise two discharge nozzles. In other examples, there can be more than two. The two discharge nozzles 222 can be situated at the 3 o'clock and 9 o'clock positions when the cover is attached to the based, but not required. Each discharge nozzle 212 has a stub that extends axially of the front wall 218 of the cover and has an oval shape cross-section. The axial end surface 272*a* of the discharge nozzle 272 is arcuate or curved, giving the end opening of the nozzle a curved profile instead of a flat profile like that of other embodiments. The base of the discharge nozzle is provided with lines to resemble a tear drop or water drop with the tip of the drop being closer to the OD of the cover 200 and the larger base of the drop closer to the circular central pattern 222.

A plurality of optical patterns 140 resembling the discharge nozzles 212 are provided near the outer periphery of the front surface of the wall 218. Each optical pattern 140 can resemble a tear drop or water drop with the tip of the drop being closer to the OD of the cover 200 and the larger base of the drop closer to the circular central pattern 222. A secondary line pattern 142 can be provided within each optical pattern 140. The inner pattern 142 gives each optical pattern the impression of being another discharge nozzle. In the example shown, there are four optical patterns 140 dispersed on the exterior of the wall 218 of the cover 200. However, there can be fewer than four or greater than four.

Figure 11:
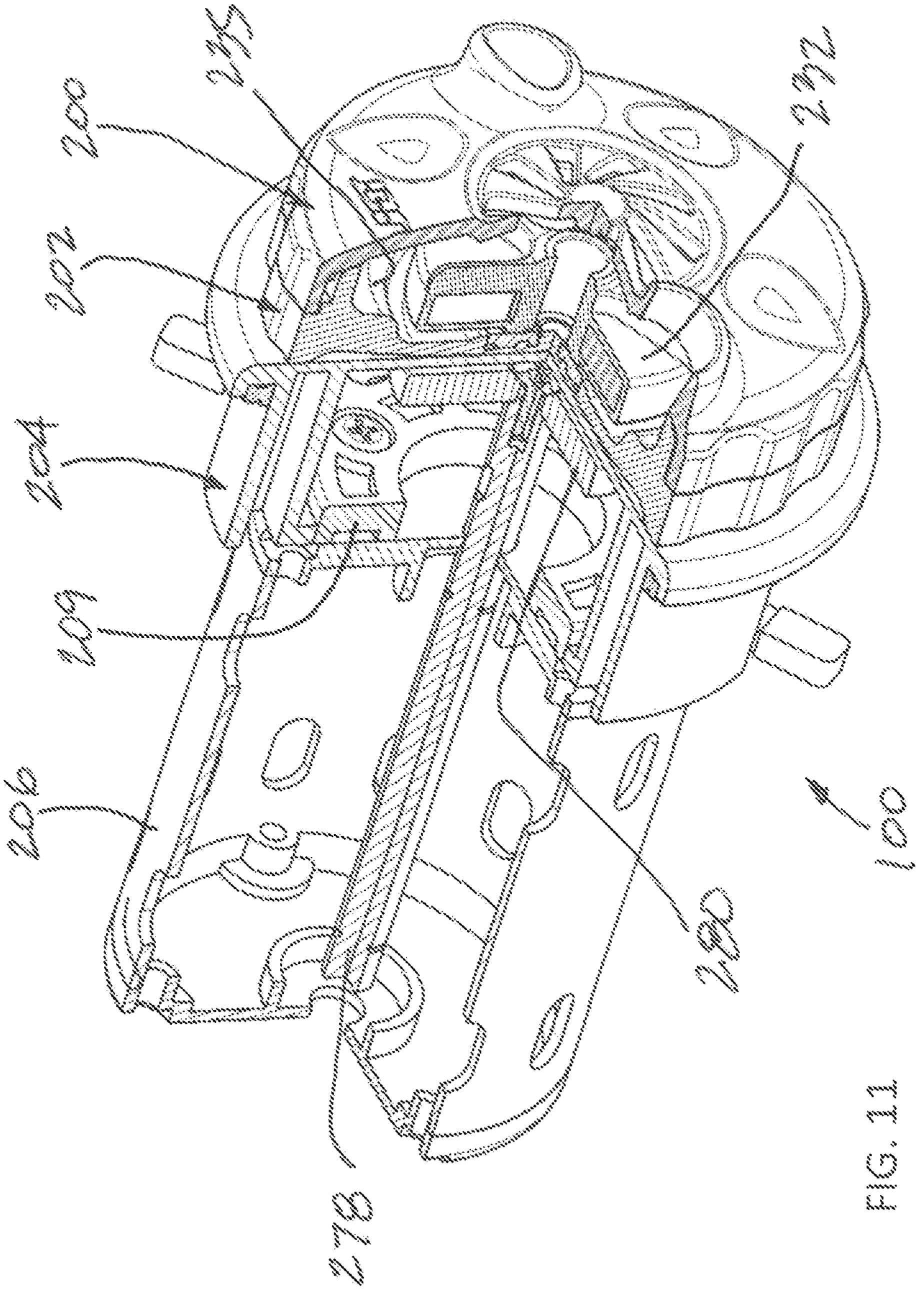
FIG. 11 is a partial cross-sectional partial perspective view of the pump of FIG. 10.

FIG. 11 is a partial cross-sectional partial perspective view of the pump 100 of FIG. 10. As shown, the pump 100 contains many overlapping structures and features as the pump 100 of FIGS. 2-9, including a motor casing 206, a mount adaptor 204, a base 202, and a cover 200. Also shown are a magnetic drive plate 280 threaded to the drive shaft 278 for magnetically rotating the impeller 232 located in the pump cavity or chamber 235 of the pump housing 201. The mount adaptor 204 is shown in a snap lock engagement with the end cap 209, which is fastened to the axial end of the motor casing 206. The stator and rotor are not shown with the motor for clarity.

Figure 12:
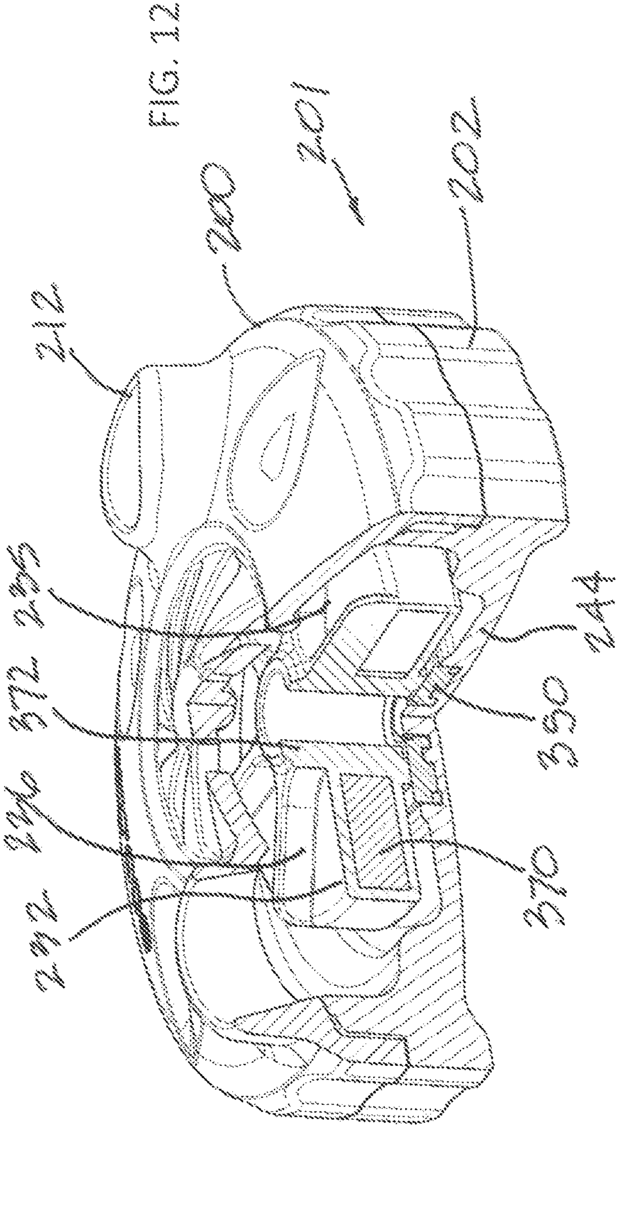
FIG. 12 is a partial cross-sectional partial perspective view of a pump housing having an impeller located therein.

FIG. 12 is a partial cross-sectional partial perspective view of the pump housing 201 having a cover 200 attached to a base 202 and defining a pump chamber 235 having an impeller 232 located therein. The impeller 232 can be similar to the impeller shown in FIGS. 5, 7 and 8 and comprises hub 372 comprising a flange body 374 containing a plurality of N and S magnet sections $\mathbf{370}_1$, $\mathbf{370}_2$, . . . $\mathbf{370}_n$.

Figure 13:
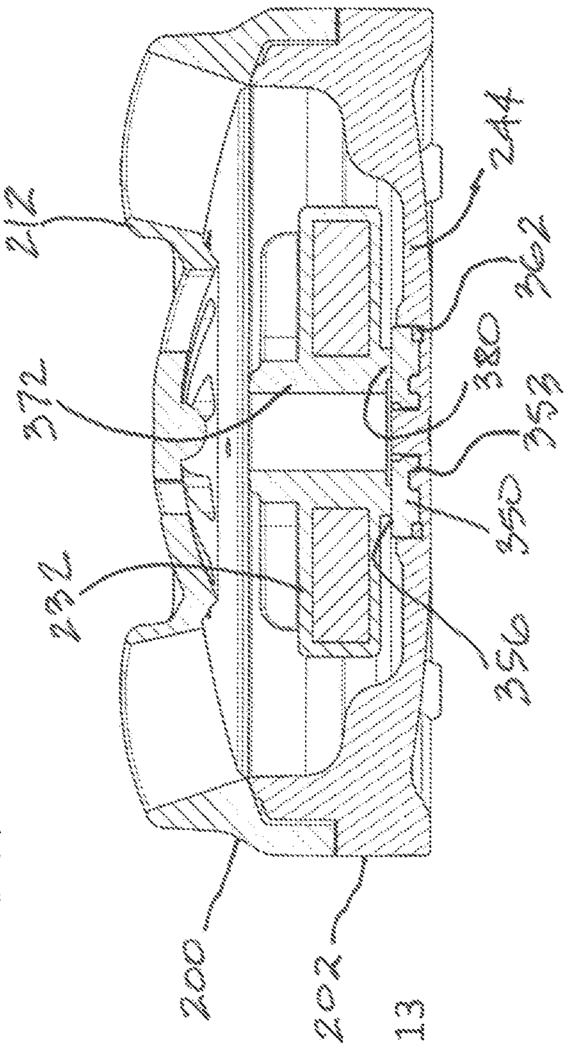
FIG. 13 is a side cross-sectional view of the pump housing of FIG. 12.

FIG. 13 is a cross-sectional side view of the pump end of FIG. 12. As shown, the hub 372 has axial end 380 in contact with the surface of the surface bearing 350. In other examples, a separately formed insert having an axial end surface 380 can attach to the hub 372 and the axial end surface of the insert can contact the surface bearing. In the example shown, the surface bearing 350 is shown with a structured lower surface 353 for placement against a corresponding recessed channel at the base wall 244 of the base 202, which can have a central stub 312 like that of FIG. 9.

A metal securing ring 362 can be used with the base wall 244 of the present invention. The metal securing ring 362 can be similar to the metal securing ring 362 of FIG. 9. As shown, the metal securing ring 362 is located in a recessed outer edge of the surface bearing 350, at the structured lower surface 353. The metal securing ring 362 is located below the upper surface 356 of the surface bearing 350, which contacts the axial end surface 380 of the impeller.

Methods of making and of using a shaftless magnetic drive pump to turn an impeller and a pedicure chair having the shaftless magnetic drive pump and components thereof are within the scope of the present invention.

Although limited embodiments of spa jet pumps and pedicure chairs and their components have been specifically described and illustrated herein, many modifications and variations will be apparent to those skilled in the art. Accordingly, it is to be understood that the spa jet pumps and pedicure chairs and their components constructed according to principles of the disclosed device, system, and method may be embodied other than as specifically described herein. The disclosure is also defined in the following claims.

What is claimed is:

1. A pump housing for a spa pump, the spa pump being sized and shaped for use with a basin of a pedicure chair, the pump housing comprising:

a pump cavity defined by a cover attached to a base, the base comprising a base wall;

an impeller located within the pump cavity, the impeller comprising a flange body comprising a magnet, a first end, and a second end;

a surface bearing attached to the base at the base wall, the surface bearing having an upper surface exposed at the base wall;

an axial end face at the first end of the impeller in contact with the upper surface of the surface bearing; and wherein the impeller is rotatable within the pump cavity without any shaft physically constraining the impeller along a rotational axis.

2. The pump housing of claim 1, wherein the base comprises a central stub having a central surface that is co-planar or recessed from the upper surface of the surface bearing.

3. The pump housing of claim 1, further comprising a metal securing ring attached to the base.

4. The pump housing of claim 3, further comprising a second metal securing ring attached to the base.

5. The pump housing of claim 3, wherein the metal securing ring comprises an opening and the surface bearing is located within the opening of the metal securing ring.

6. The pump housing of claim 1, wherein the impeller comprises a plurality of vanes.

7. The pump housing of claim 6, wherein the magnet of the impeller comprises a plurality of magnet sections arranged in a pattern of north and south poles.

8. The pump housing of claim 1, wherein the cover comprises a plurality of inlet openings located centrally of a plurality of discharge nozzles.

9. The pump housing of claim 1, wherein the surface bearing comprises a generally planar surface extending from one edge location to another edge location.

10. The pump housing of claim 9 wherein the surface bearing is made from a low friction Teflon material.

11. The pump housing of claim 1, wherein the base wall of the base comprises a bottom floor, a first radiused surface radially outwardly of the bottom floor, a first upstanding wall extending from the first radiused surface, a second radiused surface, and a second upstanding wall.

12. The pump housing of claim 11, wherein the bottom floor, the first radiused surface, and the first upstanding wall define an impeller seat having the impeller located therein.

13. The pump housing of claim 1, wherein the impeller has a hub with a hollow interior, and an insert attached to the hub.

14. The pump housing of claim 1, wherein the impeller has a hub and the axial end face is located at the hub and projects axially away from a planar surface defined by a bottom surface of the impeller.

15. The pump housing of claim 14, wherein the hub is solid without a bore.

16. The pump housing of claim 1, wherein the base is attached to a mount adaptor comprising a flange, and the mount adaptor is coupled to a motor.

17. The pump housing of claim 16, wherein the motor comprises a shaft and a magnetic drive plate attached to the shaft and the magnetic drive plate being spaced from the impeller.

18. The pump housing of claim 16, wherein the mount adaptor projects through an opening of a basin of a pedicure chair.

19. The pump housing of claim 16, wherein a plurality of stubs located on the base project into corresponding plurality of holes formed on the flange of the mount adaptor.

20. The pump housing of claim 9, wherein the base wall of the base comprises a central recess, and wherein the surface bearing is located in the central recess.

21. A method of assembling a pump housing for use with a pedicure chair, the method comprising:

placing an impeller comprising flange body with a magnet and a hub into a base cavity of a base, the base cavity defined by a sidewall and a base wall attaching a cover to the base to enclose the impeller within the base cavity;

wherein a surface bearing having an upper surface is attached to the base wall of the base;

wherein an axial end face at a first end of the hub of the impeller contacts the upper surface of the surface bearing; and wherein the impeller is rotatable within the base cavity without any shaft physically constraining the impeller along a rotational axis.

22. The method of claim 21, further comprising attaching the base to a mount adaptor, which is attached to a motor.

23. The method of claim 22, further comprising a magnetic drive plate attached to a shaft of the motor, and wherein the magnetic drive plate is magnetically attracted to the magnet of the impeller.

24. The method of claim 23, wherein the mount adaptor is attached to a basin of a pedicure chair.

25. The method of claim 21, wherein the surface bearing is mounted in a central recess of the base wall of the base.

26. The method of claim 21, wherein the magnet of the impeller comprises a plurality of magnet sections arranged in a pattern of north and south poles.

27. The method of claim 21, wherein the cover comprises a plurality of centrally located inlet openings and a plurality of discharge nozzles located radially outwardly of the plurality of centrally located inlet openings.

28. A pump housing for a spa pump, the spa pump being sized and shaped for use with a basin of a pedicure chair, the pump housing comprising:

a pump cavity defined by a cover attached to a base, the base comprising a base wall;

an impeller located within the pump cavity, the impeller comprising a hub having a first end, a second end, a flange body comprising a magnet, and a plurality of vanes extending from the flange body at the second end;

a surface bearing attached to the base at the base wall, the surface bearing having an upper surface exposed at the base wall;

an axial end face at the first end of the hub of the impeller in contact with the upper surface of the surface bearing; and wherein the impeller is rotatable within the pump cavity without any shaft physically constraining the impeller along a rotational axis.

29. The pump housing of claim 28, wherein the upper surface of the surface bearing is generally planar and circular.

30. The pump housing of claim 28, wherein the surface bearing is held in a recessed area of the base.

* * * * *